UNITED STATES PATENT OFFICE.

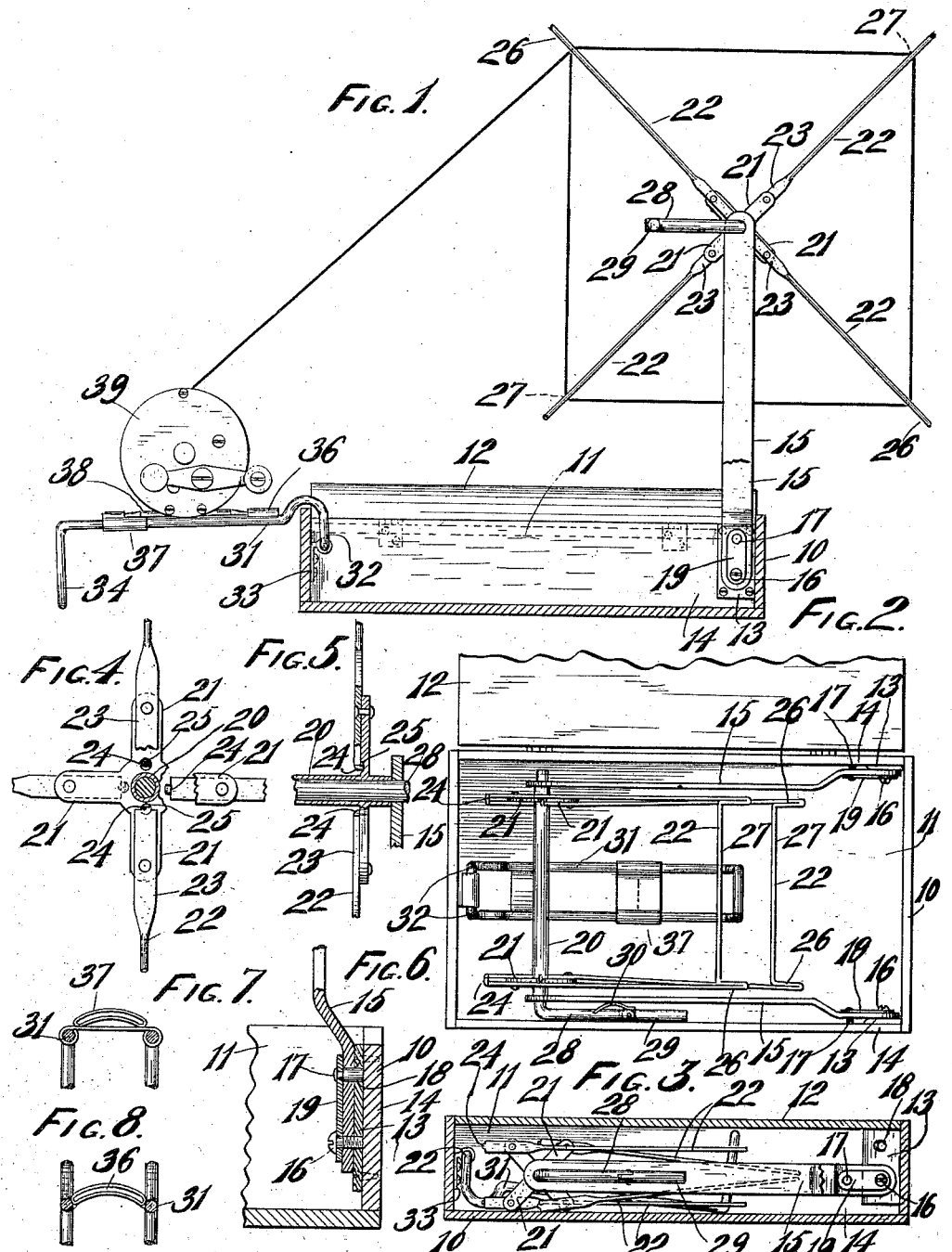

CHRISTOPHER J. C. BREAREY, OF WESTBORO, WISCONSIN.

FISH-LINE DRIER.

1,018,550.   Specification of Letters Patent.   Patented Feb. 27, 1912.

Application filed May 1, 1911.   Serial No. 624,356.

*To all whom it may concern:*

Be it known that I, CHRISTOPHER J. C. BREAREY, a citizen of the United States, and resident of Westboro, in the county of Taylor and State of Wisconsin, have invented new and useful Improvements in Fish-Line Driers, of which the following is a description, reference being had to the accompanying drawings, which are a part of this specification.

This invention relates to improvements in fish line driers particularly adapted for drying casting lines.

It is one of the objects of this invention to provide a fish line drier which is simple in construction and efficient in use and which may be manufactured at a minimum cost.

A further object of the invention is to provide a fish line drier which may be folded or collapsed when not in use and when folded, will occupy a minimum amount of space.

A further object of the invention is to provide a fish line drier which is permanently connected to a box or inclosure which serves as the base or support for the drier when in unfolded position and which is also adapted to receive and inclose the drier when the drier is in folded position.

A further object of the invention is to provide a fish line drier of the foldable type which is provided with means for securely locking the parts together in unfolded position to form a rigid structure.

A further object of the invention is to provide a fish line drier with convenient means for holding the rod reel while winding the line on the drier and also while unwinding the line therefrom.

With the above, and other objects in view, the invention consists of the fish line drier and its parts and combinations as set forth in the claims, and all equivalents thereof.

In the accompanying drawing in which the same reference characters indicate the same parts in all of the views: Figure 1 is a side view of the improved fish line drier shown in unfolded position and with a rod reel connected thereto to illustrate the manner of use, the box or inclosure being shown in section and a portion of the frame being broken away; Fig. 2 is a top view of the fish line drier in folded position and within the box, the cover of the box being swung to open position; Fig. 3 is a side view of the drier in folded position and within the box, the box being in section and a porton of the frame being broken away; Fig. 4 is a fragmentary side view of the reel portion of the drier, parts broken away to show other parts in the rear thereof; Fig. 5 is a vertical sectional view of the parts shown in Fig. 4; Fig. 6 is a vertical sectional view of a fragment of the box and a portion of the drier frame; Fig. 7 is a transverse sectional view of the reel support; and, Fig. 8 is a similar view of another portion thereof.

Referring to the drawing the numeral 10 indicates the box or inclosure, 11 the opening thereof and 12 the hinged cover. This box is of ordinary construction and may be made of wood or metal. Two side members 13 fastened to the opposite inner walls of the box sides 14 have side arms 15 pivotally connected thereto by pivot screws 16. These side arms 15 are adapted to be swung from a horizontal position within the box to a vertical position out of the box and to be locked in this latter position by means of yielding locking pins 17 carried by the arms and positioned to snap into locking recesses 18 of the side members 13. The locking pins 17 are held yieldingly in position by means of flat springs 19 which are connected thereto and are also engaged by the pivot screws 16. The pin ends, the sides of the side arms and the locking recesses thereof are beveled to permit the locking pins to freely snap into and out of the locking recesses.

The outer ends of the side arms 15 have journaled therein a transversely extending reel spindle 20 which is provided with radial arms 21 projecting in sets from opposite end portions of the spindle and between the side arms 15. U-shaped line holding members 22 having flexible flattened ends 23 are pivotally connected near their ends to the outer ends of opposite radial arms 21 and the ends of the said holding members are provided with tangs 24 bent at an angle therefrom and which are adapted to snap into locking recesses 25 provided in the radial arms. The flexible flattened ends of the U-shaped members permit the tanged portion thereof to easily snap into and out of the radial arm locking recesses and are at the same time sufficiently strong to hold the U-shaped members firmly in locked position. When in unfolded and locked position, the side portions of the U-shaped members extend radially outwardly from the radial arms.

These U-shaped members are preferably formed of wire and the outer portions thereof are overlapped a short distance to form line side guards 26 and then extend transversely across from one side portion of the U-shaped piece to the other to form the line holding portions 27. One end 28 of the spindle 20 which projects beyond one of the side arms is bent at an angle and a crank handle 29 is pivotally connected thereto for convenience in turning the spindle. The pivotal connection provides for folding the handle against the side of one of the side arms and a flat spring 30 bearing on the pivotal end of the handle holds the said handle in folded or unfolded position.

A line reel holder 31 pivotally connected to the end portion of the box opposite to the end containing the line drier is provided to hold the line reel while unwinding or winding the fish line therefrom. This reel holder is preferably formed of wire bent into U-shape with the end portions 32 of the wire again bent and pivotally extending into the eye of the eyed connection 33. The outer end of this holder is bent downwardly at right angles to the main portion 34 to form the leg 35 to hold the said main portion in horizontal position when unfolded. The reel seat forming part of this holder consists of a fixed member 36 and a slidable member 37 which is adapted to engage the base piece 38 of the reel 39 and securely hold said reel while the fish line is being unwound therefrom or wound thereon.

When the drier is in use, the parts are unfolded as shown in Fig. 1 and the reel is fastened to the reel holder by inserting one end of the base of the reel in the recess of the fixed member and sliding the slidable member into engagement with the opposite end of the base portion. The end of the fish line is then connected to one of the line holding portions of the line holding member and the line is then wound on the said holding portions by turning the crank handle. When the line is on the holding member, it will quickly dry, due to the skeleton formation of the holding member which exposes substantially all portions of the line to the air. When the line is dry, the reel handle is turned to unwind the line from the drier and wind it on the reel and the reel is removed from the drier and the drier may then be folded into the box or closure and it will occupy but a minimum amount of space.

From the foregoing description it will be seen that the drier is very simple in construction and operation and is well adapted for the purpose desired.

What I claim as my invention is:

1. A fish line drier, comprising a support, side members pivotally connected thereto, a spindle journaled in the outer end portions of the side members and provided at opposite end portions with projecting arms and at one end with a crank portion, and U-shaped line holding members pivotally connected to the projecting arms, said U-shaped members arranged to be swung to a folded position between the side members and said side members arranged to be swung downwardly to a folded position on the support.

2. A fish line drier, comprising a support, side members pivotally connected thereto, a spindle journaled in the outer end portions of the side members and provided at opposite end portions with projecting arms and at one end with a crank portion, U-shaped line holding members pivotally connected to the projecting arms, means for locking the U-shaped members in unfolded positions to the projections, and means for locking the side members in vertical position, said U-shaped members arranged to be swung to a folded position between the side members and said side members arranged to be swung downwardly to a folded position on the support.

3. A fish line drier, comprising a support, side members pivotally connected thereto and provided with means for locking said members in upright positions, a spindle journaled in the outer end portions of the side members and provided at opposite end portions with projecting radial arms and at one end with a crank handle, U-shaped line holding members having flexible flattened end portions which are pivotally connected near their ends to the outer ends of the radial arms, means for locking the flexible end portions of the U-shaped members in unfolded position to the radial arms, and a reel holder connected to the support for holding a reel while unwinding line therefrom and winding it on the U-shaped holding members.

4. A fish line drier, comprising a support, side members pivotally connected thereto and provided with means for locking said members in upright positions, a spindle journaled in the outer end portions of the side members and provided at opposite end portions with projecting radial arms and at one end with a crank handle, U-shaped line holding members having flexible flattened end portions which are pivotally connected near their ends to the outer ends of the radial arms, means for locking the flexible end portions of the U-shaped members in unfolded position to the radial arms, and a reel holder pivotally connected to the support for holding a reel while unwinding line therefrom and winding it on the U-shaped holding members.

5. A fish line drier, comprising a box like support having a cover, side members extending therein and pivotally connected thereto, said side members provided with spring means for locking the members in upright position, a spindle journaled in the outer end portions of the side members and provided at opposite end portions with pairs of projecting radial arms having locking recesses formed therein, said spindle also provided at one end with a crank handle, U-shaped line holding members pivotally connected at their end portions to the opposite radial projections and having flexible end portions with tangs formed on the ends thereof which are adapted to enter the locking recesses of the arms to lock said arms in unfolded positions, a reel holder extending into the support and pivotally connected thereto and provided with a fixed reel engaging portion and a slidable reel engaging portion, said reel holder and the side members and the U-shaped arms adapted and constructed to be folded and swung into the support and the cover of the support extended thereover.

6. A fish line drier, comprising a box like support having a cover, a foldable line holder pivotally connected to one end of the support and positioned and arranged to be folded and swung within the box support, and a reel holder pivotally connected to the opposite end of the support and positioned and arranged to be swung toward the line holder into the box and to overlap said line holder.

In testimony whereof, I affix my signature, in presence of two witnesses.

CHRISTOPHER J. C. BREAREY.

Witnesses:
J. W. KAYE,
KATHERINE HOLT.

---

Copies of this patent may be obtained for five cents each, by addressing the "Commissioner of Patents, Washington, D. C."